United States Patent Office 2,738,363
Patented Mar. 13, 1956

2,738,363

PROCESS FOR THE PRODUCTION OF α-β DIAMINOPROPIONIC ACID ESTERS

Erik F. Godefroi, Detroit, Mich., assignor to Parke, Davis & Company, Detroit, Mich., a corporation of Michigan No Drawing. Application May 7, 1954,
Serial No. 428,379

4 Claims. (Cl. 260—482)

This invention relates to a new method of obtaining diamino acid derivatives. More particularly, this invention relates to a new method for the production of α,β-diaminopropionic acid esters having the formula,

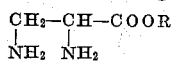

and acid additions salts thereof; where R is a lower alkyl group containing not more than four carbon atoms.

The α,β-diaminopropionic acid ester and their salts produced in accordance with the process of the invention are useful intermediates for the production of various organic compounds, in particular, α,β-diaminopropionic acid to which they may be converted by heating with aqueous mineral acid, for example, 1 N hydrochloric acid. α,β-diaminopropionic acid is useful as an inhibitor of the growth of microorganisms.

Heretofore, α,β-diaminopropionic acid has been prepared by the treatment of α,β-dibromopropionic acid with ammonia [Klebs, Z. Physiol. Chem., 19, 301 (1894), Winterstein, Z. Physiol. Chem., 59, 141 (1909), and Neuberg et al., Ber. 37, 341 (1904)] or by the treatment of α-amino-β-chloropropionic acid with ammonia under pressure [Fisher et al., Ber., 40, 3717 (1907)]. While these known methods are suitable for preparing small amounts of the desired acid, there has been a need for a new method which would make possible the production of α,β-diaminopropionic acid in increased amounts, having a high degree of purity.

Therefore, one of the objects of the present invention is to provide an efficient method for producing α,β-diaminopropionic acid ester compounds.

Another object of the invention is to provide a method for producing intermediates for the production of α,β-diaminopropionic acid.

Other objects and advantages will be apparent in the following description and claims.

In accordance with my invention, the above-mentioned diaminopropionic acid ester compounds are produced by reducing under anhydrous conditions a cyanooximoacetate having the formula,

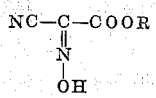

with hydrogen under pressure in the presence of a platinum catalyst and at least two equivalents of a mineral acid thereby obtaining an acid addition salt of an α,β-diaminopropionic acid ester having the formula.

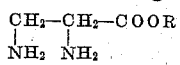

and if desired, neutralizing the said acid addition salt so obtained to convert the same to the free base form; where R has the above-mentioned significance.

In carrying out the reduction in accordance with the invention gaseous hydrogen is employed. Hydrogen pressures ranging from about 15 to 80 lbs./sq. in. and temperatures below about 100° C. can be used. However, it is preferable to keep the temperature and pressure as low as possible to minimize decomposition of the product. A temperature of about 50–55° C. and a pressure of about 50 to 60 lb./sq. in. are usually sufficient to bring about reduction within a reasonable time and hence are preferred. As mentioned above, a platinum catalyst is employed. Some of the platinum catalysts which can be used are platinum metal, platinum oxide, platinum black and the like. The reduction is carried out in an anhydrous alcoholic solvent. Lower aliphatic alcohols are suitable and in particular methanol, ethanol, isopropyl alcohol and the like can be employed. It is preferable to employ an alcohol corresponding to the alkyl moiety of the starting ester.

As indicated above, at least two equivalents of a mineral acid are employed for each mole of the cyanooximoacetate starting material. Any anhydrous mineral acid can be used, for example, anhydrous hydrogen chloride, hydrogen bromide, sulfuric acid, phosphoric acid and the like. Preferred quantity of the mineral acid is from three to six equivalents. After the reaction is complete, the α,β-diaminopropionic acid ester product is present in the reaction mixture in the form of the addition salt of the acid employed. It can either be isolated as such or it can be neutralized with a base such as ammonia, alkali metal or alkaline earth hydroxide or carbonate or the like and isolated in free base form. Since the α,β-diaminopropionic acid esters in the free base form are quite unstable it is preferable to isolate them in their acid addition salt form.

The invention is illustrated by the following examples:

*Example 1*

19.9 g. of ethyl cyanooximoacetate, prepared by the nitrosation of ethyl cyanoacetate [Conrad et al., Ber., 42, 735 (1909)], is dissolved in 250 ml. of abolute ethanol containing 30 g. of anhydrous hydrogen chloride. The solution is charged into a hydrogenation flask together with 1.8 g. of platinum oxide and shaken at 50–55° C. in hydrogen gas at a pressure of 60 lb./sq. in. When hydrogen is no longer absorbed, the reaction mixture is cooled, filtered and the filter cake taken up in 150 ml. of hot 95% ethanol, filtered and the filtrate cooled. The crystalline product which separates on standing is removed by filtration; a further yield of product is obtained by concentrating the mother liquor by evaporation, adding 20 ml. of absolute ethanol, and isolating by filtration the product which separates; M. P. 164.5–165° C. This product, ethyl α,β-diaminopropionate dihydrochloride, has the formula,

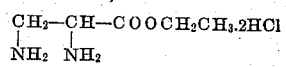

To obtain α,β-diaminopropionic acid in acid addition salt form 4.1 g. of ethyl α,β-diaminopropionate dihydrochloride dissolved in 40 ml. of one normal hydrochloric acid is refluxed for three hours, cooled, 160 ml. of absolute ethanol is added and the resulting solution concentrated by removal of 40 ml. of solvent by distillation. The residual solution is cooled, and the product which precipitates is recovered by filtration and dried. This product, α,β-diaminopropionic acid monohydrochloride (M.P. 236–237° C.), has the formula.

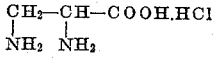

*Example 2*

12.8 g. of methyl cyanooximoacetate [Ann. Chim. et Phys. (7) 1, 507, 524] is dissolved in 250 ml. of absolute methanol containing 20 g. of anhydrous hydrogen chloride. The solution is charged into a hydrogenation flask together with 1.5 g. of platinum oxide and shaken at 60° C. in hydrogen gas at a pressure of 50 lbs./sq. in. When hydrogen is no longer taken up, the reaction mixture is cooled, filtered and the filter cake is dissolved in 150 ml. of hot aqueous methanol, filtered while hot and the filtrate cooled. The crystalline product which separates on standing is removed by filtration; a further yield of product is obtained by concentrating the mother liquor by evaporation, adding 20 ml. of absolute methanol, and isolating by filtration the product which separates. This product, methyl α,β-diaminopropionate dihydrochloride, has the formula,

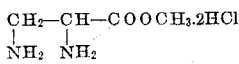

$$CH_2-CH-COOCH_3 \cdot 2HCl$$
$$\phantom{CH_2-}|\phantom{H-COO}|$$
$$\phantom{CH_2-}NH_2\ NH_2$$

Example 3

15.6 g. propyl cyanooximoacetate [Bull. Soc. Chim. France (3) 27, 1011] is dissolved in 250 ml. of absolute n-propanol containing 24 g. of anhydrous hydrogen bromide. The solution is charged into a hydrogenation flask together with 2.0 g. platinum black and shaken at 60° C. in hydrogen gas at a pressure of 50 lbs./sq. in. When hydrogen is no longer taken up, the reaction mixture is cooled, filtered and the filter cake is dissolved in 150 ml. of hot aqueous n-propanol, filtered while hot and the filtrate cooled. The crystalline product which separates on standing is removed by filtration; a further yield of product is obtained by concentrating the mother liquor by evaporation, adding 20 ml. of absolute n-propanol, and isolating by filtration the product which separates. This product, propyl α,β-diaminopropionate dihydrobromide, has the formula,

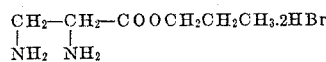

Example 4

17.0 g. of butyl cyanooximoacetate prepared in accordance with the method of Conrad et al. supra by the nitrosation of butyl cyanoacetate, is dissolved in 250 ml. of absolute n-butyl alcohol containing 20 g. of anhydrous hydrogen chloride. The solution is charged into a hydrogenation flask together with 1.5 g. of platinum oxide and shaken at 60° C. in hydrogen gas at a pressure of 50 lbs./sq. in. When hydrogen is no longer taken up, the reaction mixture is cooled, filtered and the filter cake is dissolved in 150 ml. of hot aqueous n-butanol, filtered while hot and the filtrate cooled. The crystalline product which separates on standing is removed by filtration; a further yield of product is obtained by concentrating the mother liquor by evaporation, adding 20 ml. of absolute n-butanol, and isolating by filtration the product which separates. This product, butyl α,β-diaminopropionate dihydrochloride, has the formula,

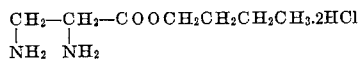

I claim:

1. Process which comprises reducing a cyanooximoacetic acid ester having the formula,

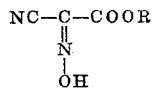

in an anhydrous lower aliphatic alcohol solvent with gaseous hydrogen in the presence of at platinum catalyst and at least two equivalents of mineral acid per mole of said acid ester thereby obtaining an acid addition salt of α,β-diaminopropionic acid ester having the formula,

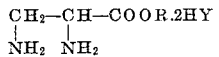

where R is a lower alkyl group containing not more than four carbon atoms and HY is one equivalent of a mineral acid.

2. Process which comprises reducing a cyanooximoacetic acid ester having the formula,

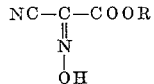

in an anhydrous lower aliphatic alcoholic solvent at a temperature below about 100° C. with gaseous hydrogen under a pressure of 15 to 80 lbs. per sq. in. in the presence of a platinum catalyst and at least two equivalents of dry mineral acid per mole of said acid ester thereby obtaining an α,β-diaminopropionic acid ester having the formula,

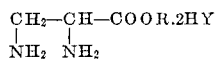

where R is a lower alkyl group containing not more than four carbon atoms and HY is one equivalent of a mineral acid.

3. Process which comprises reducing ethyl cyanooximoacetate having the formula,

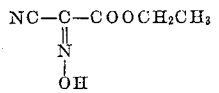

in an anhydrous lower aliphatic alcoholic solvent at a temperature of about 50 to 55° C. with gaseous hydrogen under a pressure of 50 to 60 lbs. per sq. in. in the presence of a platinum catalyst and at least two equivalents of dry mineral acid per mole of said cyanooximoacetate thereby obtaining a mineral acid addition salt of ethyl α,β-diaminopropionate having the formula,

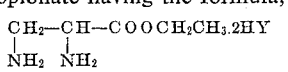

where HY is one equivalent of a mineral acid.

4. Process which comprises reducing ethyl cyanooximoacetate having the formula,

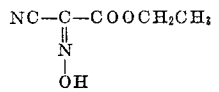

in anhydrous ethanol solvent at a temperature of about 50 to 55° C. with gaseous hydrogen under a presosure of 50 to 60 lbs. per sq. in. in the presence of platinum oxide catalyst and from three to six equivalents of dry hydrogen chloride per mole of said cyanooximoacetate thereby obtaining ethyl α,β-diaminopropionate dihydrochloride.

References Cited in the file of this patent

UNITED STATES PATENTS

| | | |
|---|---|---|
| 2,086,239 | Ralston et al. | July 6, 1937 |
| 2,306,765 | Stiller | Dec. 29, 1955 |

OTHER REFERENCES

Karer et al.: Chem. Abst. 20 (1926), 2982-3.